United States Patent [19]
Luenser

[11] 3,889,503
[45] June 17, 1975

[54] SAFETY INDICATOR SYSTEM AND METHOD FOR METAL FORMING MACHINES

[75] Inventor: Kurt K. Luenser, De Soto, Tex.

[73] Assignee: Verson Allsteel Press Company, Dallas, Tex.

[22] Filed: July 1, 1974

[21] Appl. No.: 484,670

[52] U.S. Cl. ............................ 72/6; 72/31; 100/53; 192/131 R
[51] Int. Cl.² ............................................ B21J 9/20
[58] Field of Search ........ 72/6, 31, 389; 192/131 R; 100/53

[56] References Cited
UNITED STATES PATENTS

| | | | |
|---|---|---|---|
| 2,962,633 | 11/1960 | Raymond | 192/131 R |
| 2,966,979 | 1/1961 | Zarling | 192/131 R |
| 3,103,270 | 9/1963 | Tilbury | 192/131 R |
| 3,446,985 | 5/1969 | Carlisle | 192/131 R |
| 3,628,357 | 12/1971 | Luenser | 72/6 |
| 3,666,965 | 5/1972 | Luenser | 307/112 |
| 3,749,005 | 7/1973 | Einecker | 100/53 |
| 3,815,456 | 6/1974 | Braathen | 100/53 |

*Primary Examiner*—C. W. Lanham
*Assistant Examiner*—Gene P. Crosby
*Attorney, Agent, or Firm*—Richards, Harris & Medlock

[57] ABSTRACT

The specification discloses the operation of a multi-state safety indicator on a press device having a plurality of run switches. Circuitry is provided for placing the indicator in an on state when the press is ready to be energized. Circuitry is responsive to actuation of one of the run switches for placing the indicator in an intermittent flashing state for a predetermined timed interval. Circuitry is responsive to the actuation of the remainder of the run switches during the predetermined time interval for placing the indicator in the on state to indicate operation of the press. Circuitry is also provided to place the indicator in the off state if the remainder of the run switches are not actuated during the predetermined time interval.

17 Claims, 6 Drawing Figures

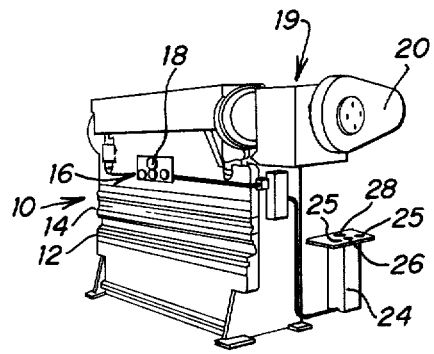
FIG. 1
| CLUTCH SELECTOR SEQUENCE | | | | |
|---|---|---|---|---|
| | CONTACT | | | |
| | 56 | 50 | 78 | 94 |
| OFF | | | | |
| INCH | | | X | X |
| SINGLE | X | X | | |
FIG. 3
ROTARY CAM LIMIT SWITCH SEQUENCE
| LINE NO. | CAM | DEGREES 45° 90° 135° 180° 225° 270° 315° | DEGREES OF OPERATION | FUNCTION |
|---|---|---|---|---|
| 85 | CLSA1 | | 300° - 240° | ANTI-REPEAT CHECK |
| 84 | CLSA2 | | 180° - 330° | CYCLE CAM |
| 77 | CLSA3 | | 260° - 200° | ANTI-REPEAT |
FIG. 4
ROTARY CAM LIMIT SWITCH SEQUENCE
| 85 | CLSB1 | | 300° - 240° | ANTI-REPEAT CHECK |
|---|---|---|---|---|
| 84 | CLSB2 | | 180° - 330° | CYCLE CAM |
FIG. 5
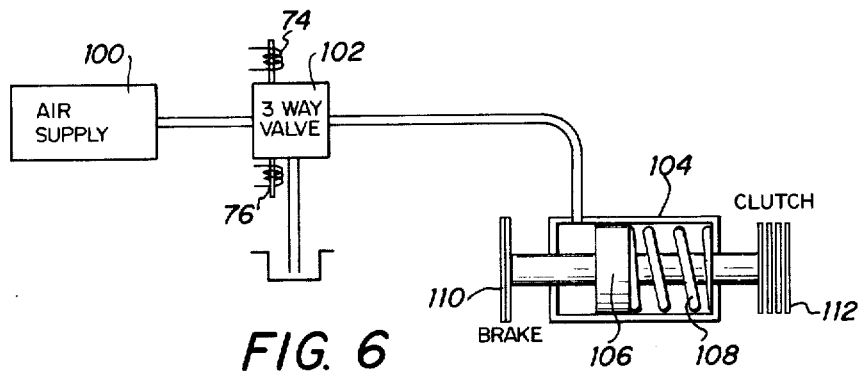
FIG. 6

SAFETY INDICATOR SYSTEM AND METHOD FOR METAL FORMING MACHINES

FIELD OF THE INVENTION

This application relates to metal forming machine safety techniques and more particularly relates to safety devices for use with presses and press brakes.

THR PRIOR ART

In metal forming machines such as presses, press brakes and the like, brakes are applied to the press drive shaft when the press ram is not energized. Often, a plurality of run buttons or switches are provided which must be concurrently operated by the operators in order to enable the press ram to be operated. In this manner, each of the operators must be anticipating operation of the ram before it can be actuated. In many press systems, an indicating light is provided on the press and is switched between illuminated and de-energized states to indicate the mode of operation of the presses. Examples of such prior systems are described in U.S. Pat. No. 3,628,357, entitled "Safety Control Circuit for Presses and the Like" and U.S. Pat. No. 3,666,965 entitled "Press Control Apparatus," and assigned to the present assignee. However, such prior indicating lights have not indicated to other operators when one operator has depressed a run button.

Prior safety systems for presses have also utilized "anti-tie down" circuits, which prevent an operator from "tieing down" or permanently depressing a run button. Such safety systems have thus prevented an operator from circumventing the dual run button safety feature by attempting to operate the run buttons with only one hand. Such prior "anti-tie down" circuits have not, however, included indicating lights for alerting all operators to the state of operation of the press. Such prior circuits have also often required relatively expensive heavy duty timers for operation thereof.

A need has arisen for an econimical and practical press safety system which not only requires concurrent energization of run switches within a prescribed time interval by multiple operators prior to ram operation, but which provides an indication to all operators when one of the run buttons is depressed and the ram is ready to be operated.

SUMMARY OF THE INVENTION

In accordance with the present invention, a safety system for a press having a plurality of start switches includes an indicator having first, second and third states. Structure is provided for placing the indicator in the first state when the press is ready to be energized. Structure is responsive to actuation of one of the start switches for placing the indicator in a second state for a predetermined time interval. Structure is responsive to the actuation of the remainder of the start switches during the predetermined time interval for placing the indicator in the first state to indicate operation of the press. Structure is also provided for placing the indicator in the third state if the remainder of the start switches are not actuated during the predetermined time interval.

In accordance with another aspect of the invention, a safety system for a press having a plurality of run switches includes a visual indicator having on, intermittent and off states. Circuitry is provided for placing the indicator in the on state when the press is ready to be energized. Circuitry is responsive to the actuation of one of the run switches for placing the indicator in the intermittent state for a predetermined time interval. Circuitry is responsive to the concurrent actuation of all the run switches during the predetermined time interval for placing the indicator in the on state to indicate energization of the press. If all the run switches are not concurrently energized during the time interval, the indicator is switched to the off state.

In accordance with yet another aspect of the invention, a method of operating a multistate safety indicator on a press having a plurality of run switches includes continuously energizing the indicator to indicate that the press is ready for operation. The indicator is intermittently energized for a predetermined time interval after one of the run switches is actuated. The indicator is switched to the on state if all of the run switches are concurrently actuated during the predetermined time interval. The indicator is turned off if all of the run switches are not concurrently actuated during the predetermined time interval.

DESCRIPTION OF THE DRAWINGS

For a more complete understanding of the present invention and for further objects and advantages thereof, reference is now made to the following description taken in conjunction with the accompanying drawings, in which:

FIG. 1 is a perspective view of a typical press system embodying the invention;

FIG. 3 is a graph of the clutch selector sequence of the circuitry shown in FIG. 2;

FIG. 4 is a graph of the actuation sequence of the rotary cam limit switch of the circuitry shown in FIG. 2;

FIG. 5 is a graph of the operation of other contacts of the rotary cam limit switch of the invention; and FIG. 6 is a diagrammatic illustration of the solenoid controlled valve system for operation of the brake-clutch system for a press brake.

DESCRIPTION OF THE PREFERRED EMBODIMENT

Figure 2:
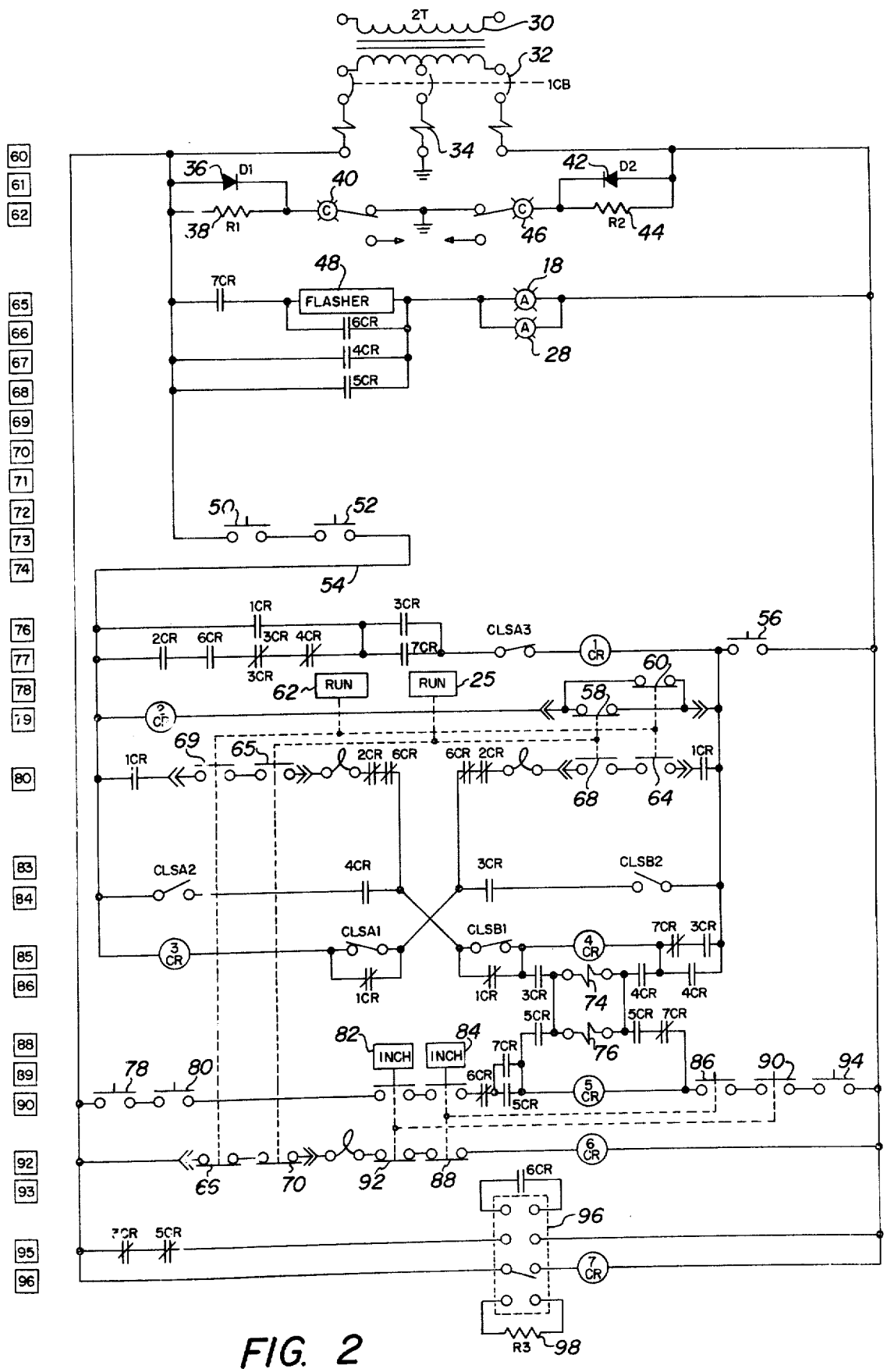
FIG. 2 is a schematic diagram of the electrical control system of the invention.

Referring to FIG. 1, a press brake designated generally by the numeral 10 comprises a female mold portion 12 and a vertically reciprocating ram 14. The press brake is shown with the ram 14 in its lowest position. In the up position of the ram 14, a sheet of material may be inserted between the mold 12 and the ram 14. The ram 14 then moves down and presses the sheet material. A control panel 16 includes two Run buttons and a Stop button. The Run buttons are spaced apart such that both hands of the operator must be utilized to concurrently depress both Run buttons. In this manner, the hands of the operator must be withdrawn completely from the ram area in order to initiate the run operation of the press. An indicator lamp 18 is also provided on the control panel 16 and may comprise any suitable type of visual indicator device. A transmission 19 is attached for operation of the press and includes a flywheel cover 20 which encloses a motor driven flywheel which drives the shaft which reciprocates the ram 14. For a more detailed description of a typical metal stamping press transmission, reference is made to U.S. Pat. No. 3,498,424 and U.S. Pat. No. 3,686,967.

A second control panel 22 is mounted on a pedestal 24 on the rear side of the press for operation by a second operator. A pair of Run buttons 25 are spaced apart by a Stop button 26 in order to require both hands of the operator in order to cause the press to run. An indicator light 28 is also positioned on the panel in accordance with the present invention. Other control buttons such as Inch buttons (not shown) will generally also be provided on control panels 16 and 22.

It will be understood that in some metal forming installations more than two control panels are provided and often operators stationed at the various control panels are not in sight of one another. Consequently, problems have heretofore occurred when one or more operators were not aware that an operator was ready to begin press operation.

In accordance with the present safety system, the indicator lights 18 and 28 are continuously energized when the power is applied to the press and the press is activated and ready to be energized. When one set of the Run buttons is depressed by an operator, the lights 18 and 28 begin an intermittent flashing to indicate that one of the operators has depressed the Run button. If the remaining Run buttons are depressed within a predetermined time interval concurrently with the depression of the initially depressed Run buttons, the press is operated and the lights 18 and 28 are energized in a continuously on state. However, if all the Run buttons are not concurrently depressed during the predetermined timing interval, the lights 18 and 28 are de-energized and all of the Run buttons are rendered inactive. In such case, the lights 18 and 28 may not again be energized until all of the Run buttons have been released. At that time, the lights 18 and 28 again become continuously energized to indicate that the press is again ready for actuation.

In this manner, it will be seen that the present indicator system indicates to all operators when one of the operators is depressing one of the Run button set, regardless of whether or not the operators are in sight of one another. Due to the predetermined timing interval of the system, the press may not be energized by one operator merely riding a Run button, but all operators must concurrently operate the Run buttons before energization of the system. In this manner, the hands of all the operators are completely removed from the area of the ram, prior to ram operation as a safety feature.

FIG. 2 is a schematic diagram of the electrical control circuitry of the present clutch control safety system. For ease of description of the circuit shown in FIG. 2, lines 60-96 are utilized to indicate the position of particular elements within the circuit. A.C. power is applied through an isolation transformer 30 to the control circuitry. The outlet of transformer 30 is connected to a circuit breaker 32, and a center tap 34 is tied to circuit ground to provide ground fault protection on either side of the A.C. line. A diode 36 is connected to one terminal of the transformer 30 and is connected across a resistance 38. The cathode of the diode 36 is connected to a lamp 40 which is tied to circuit ground. Similarly, a diode 42 is connected across a resistance 44 and is connected to a lamp 46. When the center tap of the transformer 30 is connected, the lamps 40 and 46 are illuminated. If the center tap is not connected, the lamps are de-energized.

Normally open relay contacts 7CR which are operated by relay 7CR to be later described, are connected to a flasher 48. While it will be understood that any suitable flasher circuit may be utilized with the present system, the Daykin Model No. 900-FS2 for 120 V. A.C. 60Hz signals may be advantageously utilized. The flasher is connected in series with the indicator lamp 18 and 28, previously described. Normally open relay contacts 6CR, 4CR and 5CR are connected across the flasher 48 in the manner illustrated.

A single pushbutton switch 50 is connected in series with a yes/no switch 52, the switches 50 and 52 being connected via a lead 54 to a normally open relay contact 1CR. The normally open relay contacts 2CR and 6CR and normally closed relay contacts 3CR and 4CR are connected in series across relay contacts 1CR. Relay contact 3CR is connected with normally open relay contacts 7CR in the manner illustrated. A rotary cam limit switch CLSA3 is connected in series with a relay 1CR. A Single control button switch 56 is connected between the relay 1CR and a terminal of the transformer 30.

On line 79 of the circuit, relay 2CR is connected in series with normally closed Run switches 58 and 60. The Run button 62 comprises the two spaced apart Run buttons located on the control panel 16 shown in FIG. 1. The Run button 25 comprises the spaced apart Run buttons 25 located on the panel 22 shown in FIG. 1. Run button 62 controls the normally closed contact 60, a normally open contact 64 (line 80), a normally open contact 69 (line 80) and a normally closed contact 66 (line 92). The Run button 25 controls the normally closed contacts 58, normally open contacts 65 (line 80) and 68 and a normally closed contact 70 (line 92).

Two normally opened relay contacts 1CR are connected in series with run switches 69 and 65 on line 80, respectively, and are also connected in series with normally closed relay contacts 2CR and 6CR. Similarly, normally opened relay contacts 1CR are connected in series with run switches 64 and 68 and with normally closed relay contacts 2CR and 6CR. On line 84, the rotary cam limit switch CLSA2 is connected in series with normally opened relay contacts 4CR. The rotary cam limit switch CLSB2 is connected in series with normally open relay contacts 3CR.

Relay 3CR on line 85 is connected in series with rotary cam select switch CLSA1, with normally closed relay contacts 1CR connected across switch CLSA1. Also on line 85, rotary cam limit switch CLSB1 is connected in series with relay 4CR and normally closed relay contacts 7CR and normally opened relay contacts 3CR. Normally closed relay contacts 1CR are connected across the rotary cam limit switch. Normally open relay contacts 3CR are connected in series with a solenoid winding 74 which controls a three-way valve for operation of the clutch of press. Normally open relay contacts 4CR are connected with a solenoid 74, and another set of normally opened relay contacts 4CR are connected across contacts 7CR and 3CR.

A second solenoid winding 76 is connected across the solenoid winding 74. Normally open relay contacts 5CR are connected to one winding of the solenoid winding 76, while normally open relay contacts 5CR and normally closed relay contacts 7CR are connected to the other terminal of the solenoid winding 76.

Referring to line 90 of the electrical schematic, an Inch pushbutton 78 is connected in series with a yes/no Inch switch 80 and in series with two Inch buttons 82 and 84. Inch buttons 82 and 84 are located on the control panels shown in FIG. 1.

Normally closed relay contacts 6CR are connected in series with the Inch button switches 82 and 84. Normally open relay contacts 7CR and 5CR are connected in parallel and are connected to a terminal of relay 5CR. Inch pushbutton switch 84 is connected to switch contacts 86 and 88. Inch pushbutton switch 82 is connected with switch contacts 90 and 92. An Inch pushbutton energization switch 94 is also connected on line 90.

Referring to line 92, the series relay 6CR is connected in series with Run switch contacts 66 and 70 and with Inch contacts 92 and 88. Referring to line 95, normally closed relay contacts 3CR and 5CR are connected in series with terminals L1 and L2 of a timer 96. Normally open relay contacts 6CR are connected across terminals S1 and S2 of the timer. On line 96, voltage is applied from the transformer 30 to terminal C1 of the timer which is interconnected with the contacts of the button timer relay BTR. Terminal C2 of the timer is connected to relay 7CR. Terminals R1 and R2 of the timer 96 are connected to a resistor 98 having a magnitude dependent upon the desired timer timing cycle.

In the preferred embodiment, a timer such as the Allen-Bradley No. 852S solid state timing relay may be utilized for the timer 96. An important aspect of the present invention is that an economical and simple solid state timer which has low power requirements may be utilized for control of the present system.

In operation, the system may be placed in the off, Inch or Single Run modes by operation of a multiposition switch on the front panel of the press. FIG. 3 illustrates the switch contacts which are closed by the multiposition switch to provide the desired operating modes, with an X indicating that the switch is placed in the closed position. Referring to FIG. 3, it will be seen that none of the switches 50, 56, 78 or 94 are closed in the off mode. In the Inch mode, switches 78 and 94 are closed. In the single stroke mode, switches 56 and 50 are closed.

FIG. 4 illustrates operation of the rotary cam limit switches CLSA1-CLSA3. As seen in FIG. 4, CLSA1 is open only during 0°–240° and 300°–360° of the rotation of the cam which synchronized with operation of the press ram. Switch CLSA2 is closed during 180°–330° of operation of the press drive shaft. Switch CLSA3 is closed between 0–200° and 260°–360° of operation of the press.

Referring to FIG. 5, it will be seen that the limit switch CLSB1 is closed from 0°–240° and 300°–360° of operation of the press, while switch CLSB2 is open only between 180°–330° of operation.

In operation of the present system, power is applied to the transformer 30 and relay 6CR is energized, as switch contacts 66, 70, 92 and 88 are normally closed. This causes closing of the relay contacts 6CR on lines 66, 77 and 93 and opening of the relay contacts 6CR on lines 80 and 90. The button timer relay BTR is closed at the closure of switch contact 6CR on line 93 and relay 7CR on line 96 is then energized. Energization of relay 7CR causes closing of relay contacts 7CR on lines 65 and 77 and 89 and opening of normally closed relay contacts on lines 85 and 88. The closing of relay contacts 6CR on line 66 shorts out the flasher 48. The closing of relay contacts 7CR on line 65 applies power to continuously energize the lamps 18 and 28 to indicate that the press has the power applied and is ready to be energized.

When one of the sets of the Run buttons 62 or 25 are depressed, relay 6CR is de-energized due to the opening of the contacts 66 or 70. This causes the timer 96 to begin timing out. Moreover, the opening of the relay contacts 6CR on line 66 places the flasher 48 in the circuit and lamps 18 and 28 are then intermittently operated in a flashing manner to indicate to all operators that a Run button has been pushed. If only a single Run button is depressed during the timing cycle of the timer 96, the timer times out, the button timer relay BTR is opened and the relay 7CR is dropped out. This causes opening of the relay contacts 7CR on line 77, thereby dropping out relay 1CR. This also causes opening of relay contacts 7CR on line 65, thereby turning the lamps 18 and 28 off to indicate expiration of the timing cycle to the operators.

Relay 1CR on line 77 is the anti-repeat relay. For relay 1CR to be energized, relay 2CR on line 79 must be energized to close the relay contacts 2CR on line 77. Relay 2CR is energized by the release of all the Run buttons 25 or 62 due to closure of either contacts 58 or 60. Energization of relay 1CR is also dependent upon closure of relay contacts 6CR on line 77 which occurs only when all the Run buttons are released. Energization of 1CR is also dependent upon closure of relay contacts 7CR on line 77, which occurs only when the timer 96 is not timed out. Energization on relay 1CR is also dependent upon closure of the rotary cam limit switch CLSA3, the energization of which is illustrated in FIG. 4. When relay 1CR is energized, relay contact 1CR is closed on line 76, thereby shorting around relay contacts 2CR-4CR on line 77. The anti-repeat relay thus prevents repeat operation of the present circuit after the timing period has expired until all of the run switches are released.

Circuitry on line 18 of the system comprises the initiating portion of the system. For power to be applied to the energizing clutch relays of the system, relay 1CR must be energized in order to close relay switch contact 1CR on line 80, and all of the Run buttons must be concurrently depressed in order to close contacts 69, 65, 68 and 64. Relays 2CR and 6CR must be de-energized, which condition occurs if at least one of the Run buttons is depressed.

Power is applied upon the occurrence of the above-noted condition first to relay 3CR, which causes the timer 96 to drop out. This causes the relay 7CR to be de-energized, thereby opening relay contacts 7CR on line 85 which had previously prevented the application of power to relay 4CR. This causes the energization of relay 4CR on line 86 which causes relay contact 4CR on line 86 to be closed to apply power to the solenoid winding 74. At this time, the lamps 18 and 28 are continuously energized.

Referring to FIG. 6, a schematic diagram of the clutch and brake energizing system of the invention is illustrated. A supply of pressurized air 100 applies air through a three-way valve 102 to a chamber 104 containing a piston 106. The three-way valve 102 is operated by solenoids 74 and 76 shown in FIG. 2. A spring 108 normally biases the piston 106 such that brake clutch plates 110 are energized to normally apply the brake. Upon proper energization of valve 102, pressurized air is applied from supply 100 into chamber 104 to move the piston 106 against the force of the springs 108 to energize clutch plates 112, in order to energize the press. Construction of a brake-clutch transmission system is described in greater detail in U.S. Pat. No. 3,595,353 issued July 27, 1971 to the present Assignee.

An important aspect of the invention is that if the timer 96 malfunctions, the press does not operate because of relay 7CR which monitors the timer 96. This enables the use of a sensitive yet inexpensive, solid state timer.

In operation of the present system in the Inch mode, one of the Inch buttons 82 or 84 is depressed. Relay 6CR is dropped out and the timer 96 begins to time out. In the manner previously described, the lamps 18 and 28 begin to intermittently flash. If the second Inch button is depressed before the timer 96 times out, relay 5CR is energized, as relay 7CR is already energized. This causes the opening of relay contacts 5CR in line 95, which causes the timer 96 to drop out, thereby de-energizing relay 7CR. Energization of relay 5CR causes relay contacts 7CR in line 89 to be bridged, so the clutch solenoid winding 76 is energized. At this time, lamps 18 and 28 are continuously energized.

If the second Inch button is not depressed during the timing cycle of the timer 96, relay 7CR is dropped out. If the second Inch button is then depressed, relay 5CR cannot be energized due to the fact that relay contacts 7CR on line 89 are open.

It will thus be seen that the present system provides several safety features to the operation of a metal stamping press system. First, the Run buttons of the press must be energized by both hands of the operator, thereby preventing one of the hands of the operators from being in the ram area. When the press system is ready for energization, an indicator provides a solid on indication to all operators. When one of the Run button sets is depressed, the indicator goes to a second state which in the preferred embodiment is a flashing intermittent state, to alert all operators that a Run button has been pressed. If all the remaining Run buttons are not concurrently depressed during a predetermined timing interval, such as for example 5 seconds, the indicator lamp becomes de-energized and the system cannot be again energized until all Run buttons are released. If all the Run buttons are concurrently energized during the timing cycle, the indicator is turned on continuously to indicate that the ram is functioning.

While the indicators have been described as being lamps, it will be understood that any visual indicator may alternatively be utilized. In addition, audible multi-state indicators may be utilized to indicate the various state of operation of the system. The particular construction of the electrical control circuitry of the invention enables the use of an inexpensive solid state timing device and flasher.

Whereas the present invention has been described with respect to specific embodiments thereof, it will be understood that various changes and modifications will be suggested to one skilled in the art, and it is intended to encompass such changes and modifications as fall within the scope of the appended claims.

What is claimed is:

1. A safety system for a press having a plurality of start switches comprising:
    indicator means having first, second and third states,
    means for placing said indicator means in said first state when the press is ready to be energized,
    means responsive to actuation of one of the start switches for placing said indicator means in said second state for a predetermined time interval, and
    means responsive to the actuation of the remainder of the start switches during said predetermined time interval for placing said indicator means in said first state to indicate operation of the press.

2. The safety system of claim 1 wherein each of said start switches comprises two run switches which must be concurrently actuated.

3. The safety system of claim 1 and further comprising:
    means for placing said indicator in said third state if the remainder of the start switches are not actuated during said predetermined time interval.

4. The safety system of claim 3 and further comprising:
    means for switching said indicator means from said third state to said first state when all of said start switches are de-energized.

5. The safety system of claim 3 wherein said indicator comprises a lamp.

6. The safety system of claim 5 wherein said first state comprises a continuously energized mode, said second state comprises an intermittent flashing mode and said third state comprises a de-energized mode.

7. A safety system for a press having a plurality of run switches comprising:
    a visual indicator having on, intermittent and off states,
    means for placing said indicator in said on state when the press is ready to be energized,
    means responsive to the actuation of one of the run switches for placing said indicator in said intermittent state for a predetermined time interval,
    means responsive to the concurrent actuation of said run switches during said predetermined time interval for placing said indicator in said on state to indicate energization of the press.

8. The safety system of claim 7 and further comprising:
    means for placing said indicator in said off state if said run switches are not concurrently actuated during said predetermined time interval.

9. The safety system of claim 7 wherein the press is de-energized by the application of a brake.

10. The safety system of claim 7 wherein each of said run switches comprise two run buttons which must be simultaneously operated by an operator.

11. The safety system of claim 7 and further comprising:
    means for changing said indicator from said off state to said on state when all of said run switches are de-energized.

12. The safety system of claim 7 and further comprising a plurality of said visual indicators operable in parallel for a plurality of operators.

13. The safety system of claim 7 and further comprising:
    a timing circuit which is energized in response to actuation of one of said run switches.

14. The safety system of claim 13 wherein said timing circuit comprises a solid state electronic timer.

15. The safety system of claim 13 and further comprising:
    a relay connected to monitor the operation of said timing circuit, said relay preventing operation of said system upon malfunction of said timing circuit.

16. The safety system of claim 13 and further comprising:

a solid state flasher which is connected to said visual indicator when one of said run switches is actuated.

17. The method of operating a multistate safety indicator on a press having a plurality of run switches comprising:

continuously energizing the indicator to indicate that the press is ready for operation, intermittently energizing the indicator for a predetermined time interval after one of the run switches is actuated, continuously energizing the indicator if all of the run switches are concurrently actuated during said predetermined time interval, and de-energizing the indicator if all of the run switches are not concurrently actuated during said predetermined time interval.

* * * * *